Oct. 8, 1957

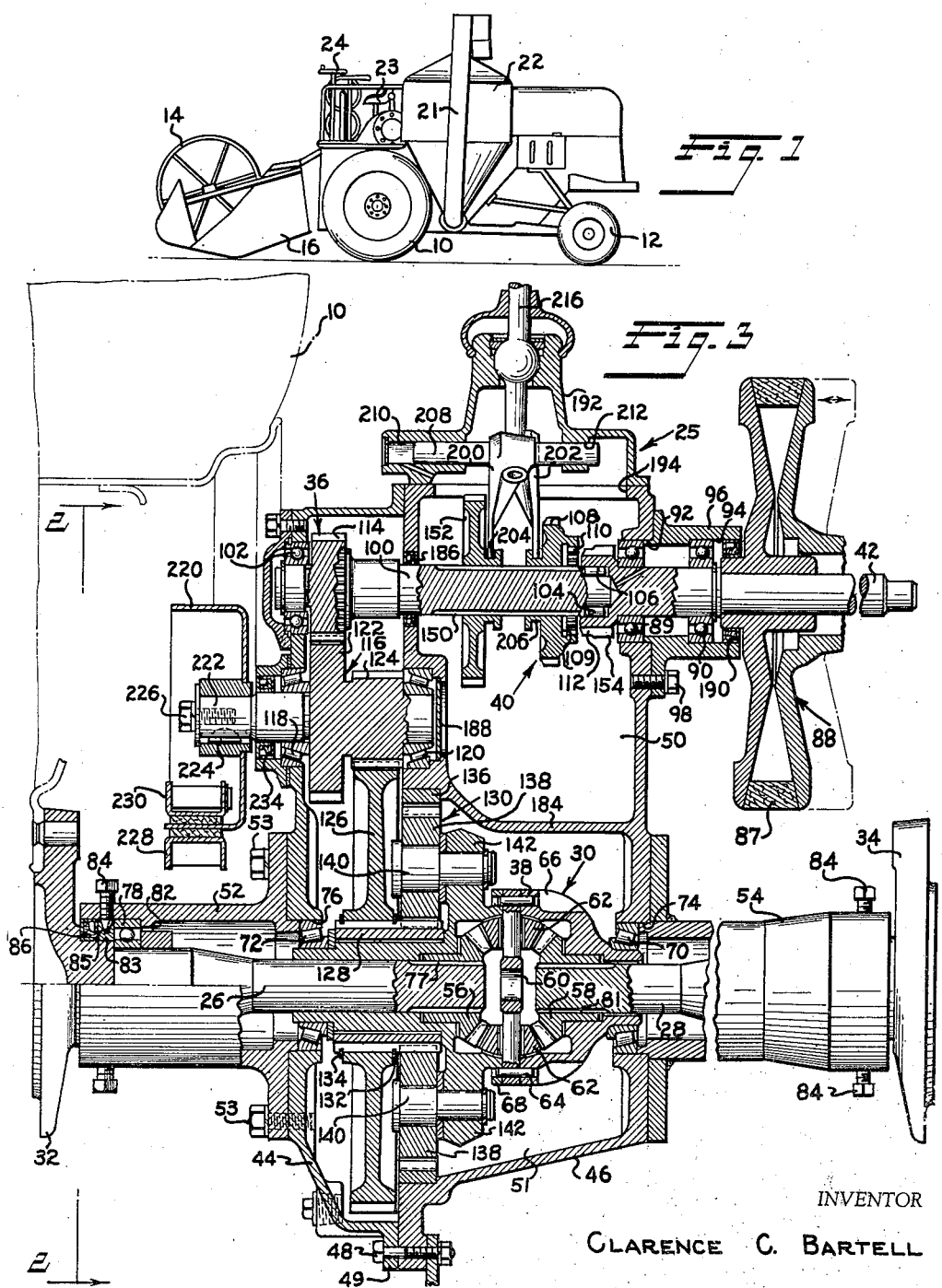

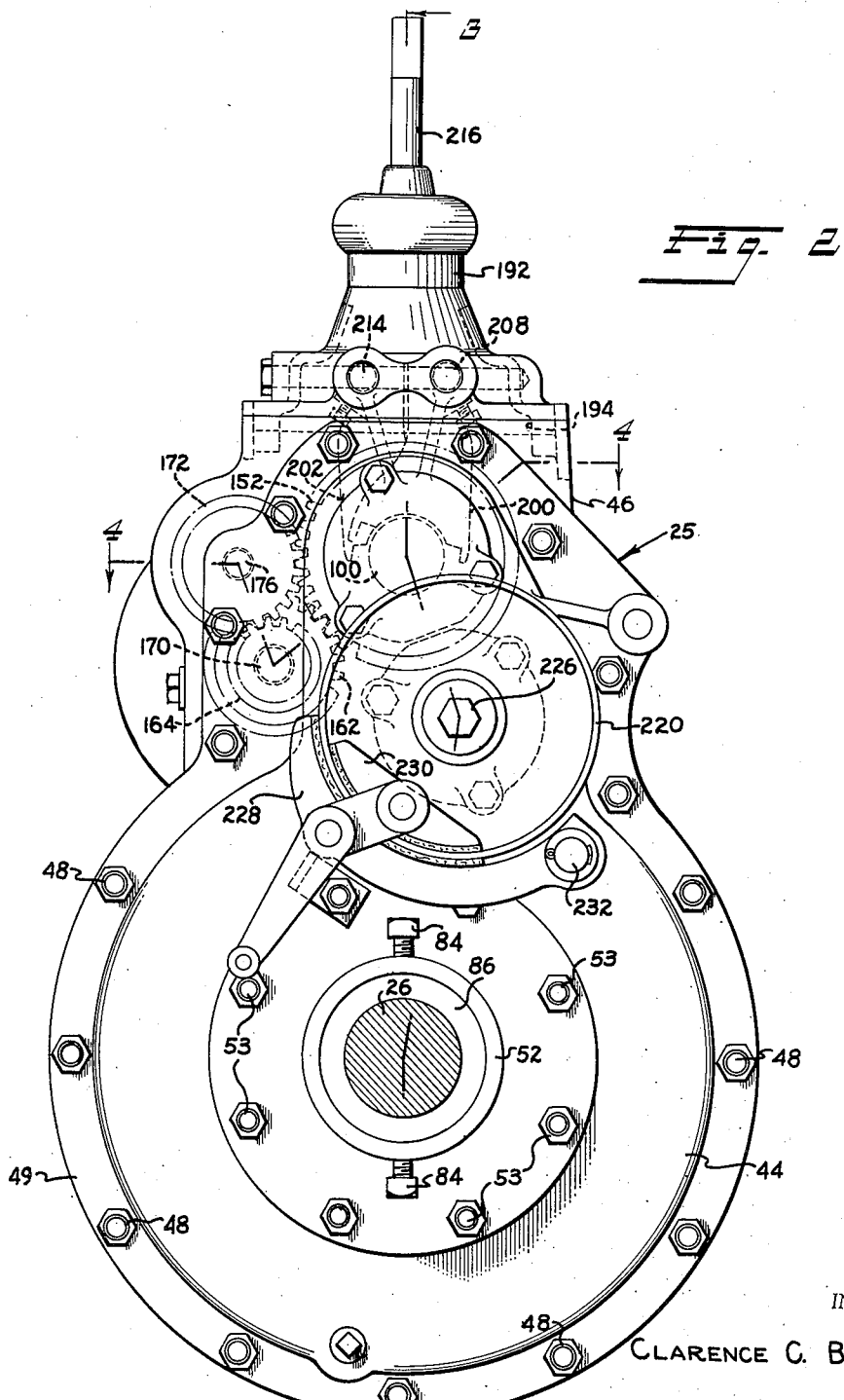

C. C. BARTELL 2,808,738

VEHICLE DRIVE MECHANISM

Filed June 18, 1952

INVENTOR

CLARENCE C. BARTELL

BY *Strauch, Nolan & Diggins*

ATTORNEYS

United States Patent Office 2,808,738
Patented Oct. 8, 1957

2,808,738

VEHICLE DRIVE MECHANISM

Clarence C. Bartell, Detroit, Mich., assignor, by mesne assignments, to Rockwell Spring and Axle Company, Coraopolis, Pa., a corporation of Pennsylvania Application June 18, 1952, Serial No. 294,297

5 Claims. (Cl. 74—701)

The present invention relates in general to improvements in vehicle drive mechanisms and in particular relates to improvements in drive mechanisms for low speed agricultural implements such as crop harvesting vehicles.

In crop harvesting vehicles, such as combines, it is desirable that as much as possible of the available space on the vehicle be utilized for the many parts which actually perform the crop harvesting function as distinguished from those which perform the function of moving the vehicle. These parts, which include the cutter bar, crop gathering reel, header conveyor, separator, elevator, grain bin, blower, engine and the several means to drive these parts, when most efficiently located and interconnected leave only a minimum of space for the drive train which controls the movement of the vehicle.

The particular problem to which this invention is directed is to provide a simple compact drive mechanism between the prime mover and the vehicle drive wheels which is preferably enclosed within a sealed unitary compartmental housing and which, while providing the necessary high reduction ratios from the prime mover power shaft to the drive wheels, utilizes a minimum of the available space on the harvesting vehicle.

In most of the prior harvesting vehicles, as is illustrated by Patent No. 2,402,637 issued June 25, 1946 to B. W. Keese for Drive Mechanism and Patent No. 2,647,597 issued August 4, 1953 to B. W. Keese for Vehicle Drive Mechanism, the drive mechanism is a generally conventional automotive drive train modified and adapted to perform the job at hand with little regard for the efficient utilization of space and the saving of weight.

It is, therefore, the primary object of this invention to provide a light, compact, rugged drive train assembly for crop harvesting vehicles, such as combines, which has a low weight per unit area of ground surface traction contact and which can be mounted closely adjacent one of the drive wheels in closely spaced relation to the axis of drive wheel rotation to thereby minimize the space on the vehicle which must be allocated to this assembly.

A further object is to provide a novel drive train for harvesting vehicles such as combines including a novel combination of spur and planetary drive gearing to give appropriate ratios of engine speed to ground wheel speed while utilizing but a minimum of space.

More specifically, it is an object of this invention to provide a drive train assembly for harvesting vehicles such as combines and the like which is of such construction that a transmission mechanism, a speed reducing gear mechanism and a differential mechanism are associated and interconnected in a compact unitary assembly which is sealed against the egress of lubricant and ingress of dirt and moisture and which can be partially nested within one of the drive wheels and mounted entirely within the axially projected profile of such wheel.

These and other objects of the present invention will become more fully apparent when considered in connection with the appended claims and as the following description proceeds in reference to the accompanying drawings wherein:

Figure 1 is a schematic side elevation view of a combine type crop harvesting vehicle in which it is presently contemplated that the vehicle drive train assembly of the present invention is of primary utility;

Figure 2 is an end view of the vehicle drive train assembly of the present invention taken from a position immediately inside the vehicle drive wheel adjacent which the drive train assembly is mounted, being substantially a view along the line 2—2 of Figure 3;

Figure 3 is a sectional view of the vehicle drive train assembly of the present invention taken along the line 3—3 of Figure 2;

Figure 4:
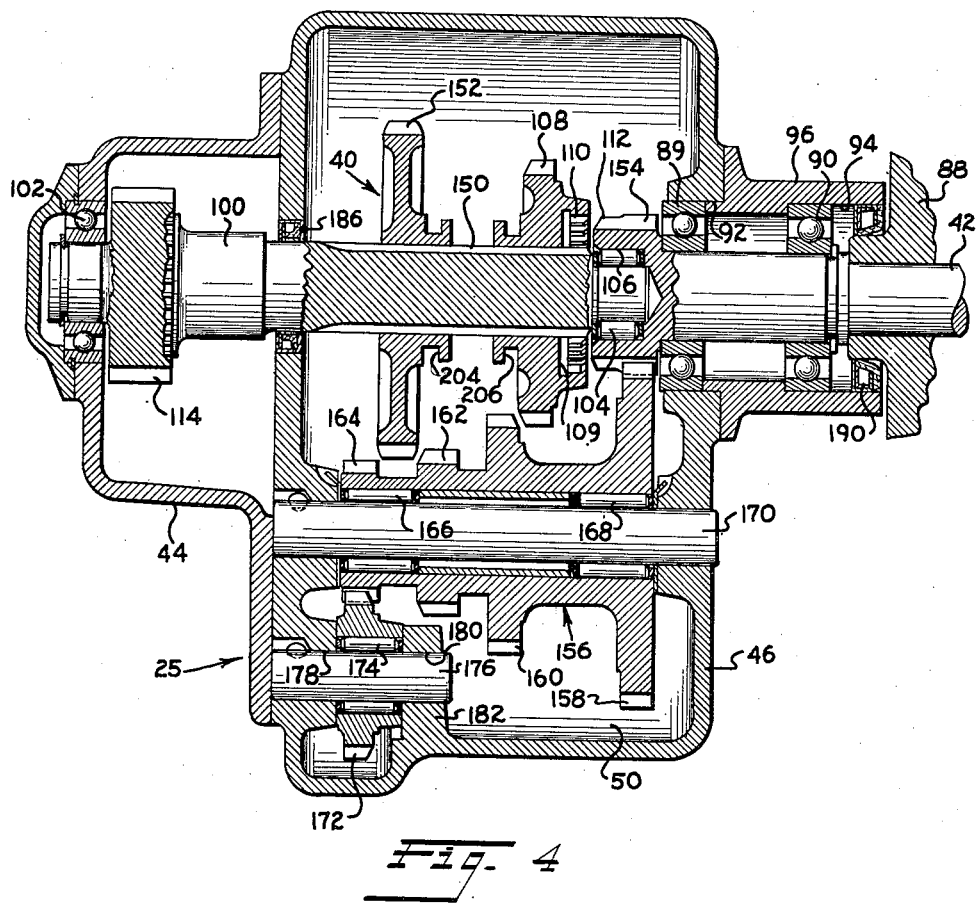
Figure 4 is a sectional view taken along the line 4—4 of Figure 2 showing the change speed and reverse drive transmission gear mechanism of the drive train assembly.

A small combine is schematically illustrated in Figure 1 of the drawings to facilitate explanation of the structural relation of the vehicle drive train of the present invention to the crop harvesting components of such a vehicle. As is illustrated in Figure 1, the vehicle assembly is supported upon a pair of coaxial normally leading drive wheels 10 and a pair of coaxial normally trailing dirigible wheels 12. The basic crop harvesting components of the assembly are a rotatable crop gathering reel 14, a crop receptacle 16 upon the leading edge of which is mounted a cutter bar (not shown) and at the rear of which is located a conveyor (not shown) which feeds the gathered crop to an elevator (not shown) for transportation to a separating unit, an elevator 21 for the separated grain, and a grain bin 22. The crop harvesting and vehicle movement control components of the combine are all controlled by the operator from the driver's seat 23 by manipulation of the several hand wheels such as 24 and operating levers in the conventional manner.

The prime mover or engine (not shown) by which the combine is powered is mounted transversely of the vehicle on the vehicle frame slightly to the rear of the large drive wheels 10 and is preferably coupled through a belt and pulley arrangement to the vehicle drive train assembly 25 (Figures 2 and 3) which is located between and within the axially projected profile of the driving wheels 10. The drive train assembly 25 to the drive wheels 10 is best illustrated in Figure 3 wherein it is shown to comprise a pair of coaxial shafts 26 and 28 which at their adjacent ends are operatively interconnected by a differential mechanism 30 and which at their outer ends are formed with wheel mounting flanges 32 and 34 respectively to which the wheels 10 are fixed, a speed reduction or transfer gear train 36 operable to drive the cage 38 of the differential mechanism 30, a change speed and reverse drive transmission mechanism 40 coupled to drive the speed reduction gear train 36, and an engine driven shaft 42 to which the transmission mechanism 40 can be operably connected. The transmission mechanism 40 and the differential mechanism 30 are located in alignment transversely of the vehicle and the transfer gear mechanism 36 is located at one side, preferably adjacent the closer drive wheel 10 so that adequate clearance for the transmission mechanism controls and the drive belt relative to the closer drive wheel 10 is maintained.

As will be noted, the transmission mechanism 40, the speed reduction gear train mechanism 36, and the differential mechanism 30 are all enclosed within a common drive train housing formed of two sections 44 and 46 which are secured together by bolt assemblies 48. For purposes of differentiation, housing sections 44 and 46 will sometimes hereinafter be denominated respectively as the transfer gear housing and the transmission and differential housing. Housing section 44, which is shallow and concave in cross section, is provided with a peripheral flange 49 by which it is secured by bolt assemblies 48 to a deeper transmission and differential housing 46. Housing section 46 is cored to provide separate compartments 50 and 51 for the transmission mechanism 40 and differential mechanism 30 respectively, compartment 50 being located above compartment 51 and sealed from the remainder of the assembly as will be made fully apparent presently. An axially short axle housing section 52 is fixed to the exterior of section 44 of the drive train housing by bolts 53 and an axially long axle housing section 54 is similarly fixed to the opposite wall of drive train housing section 46 in coaxial alignment with the axially short section 52. By this arrangement, the entire drive train assembly is located closely adjacent one of the drive wheels 10 so that the major portion of the space between the coaxial drive wheels 10 can be utilized for the crop harvesting components of the vehicle.

The differential mechanism 30 is of generally conventional construction comprising a pair of side gears 56 and 58 coaxially journalled upon the differential cage 38, a differential spider 60 upon each of the equiangularly spaced arms of which is journalled a differential pinion 62 in constant mesh with both of the side gears 56 and 58, spider 60 being fixed relative to the cage 38 by a plurality of pins 64 extending through the radially extending arms thereof. The cage 38 of the differential mechanism 30 is formed of two sections 66 and 68 which are separable along the plane of the axes of pinions 62 and which are secured together in coaxial alignment as by bolts (not shown). The differential mechanism cage 38 is journalled for rotation coaxially relative to the axis of rotation of the drive wheels 10 by spaced anti-friction bearings 70 and 72 mounted in coaxially aligned bores 74 and 76 formed respectively in the outer walls of the drive train housing sections 46 and 44 respectively. It will be noted that the adjacent ends of axle housing sections 52 and 54 are piloted within bores 76 and 74 respectively to assure their coaxial alignment and abut against the outer races of bearings 72 and 70 respectively to axially fix the differential mechanism 30.

The wheel connected drive shaft 26, which is fixed for rotation with the side gear 56 as by a spline connection 77, is journalled for rotation at its outboard end in an anti-friction bearing 78 within the axle housing section 52 and at its inboard end by the bearing contact of side gear 56 with section 68 of differential cage 38. The wheel connected drive shaft 28, which is similarly journalled at its outboard end in an anti-friction bearing (not shown) carried by axle housing section 54 and its inboard end by the bearing contact of side gear 58 with section 66 of the differential cage 38, is connected to the differential side gear 58 for conjoint rotation therewith as by spline connection 81.

The outboard bearings of shafts 26 and 28, as is fully illustrated in connection with bearing 78, are retained axially within the respective axle housing sections between an integral annular shoulder 82 and a removable ring 83 axially retained in position by set screws 84 engaging a peripheral groove 85 thereon. The axle housing section 52 is sealed against outward lubricant movement and against inward movement of dirt and moisture by an annular lubricant seal 86 disposed within axle housing section 52 outwardly of the bearings 78. The outboard end of axle housing section 54 is sealed in the same manner.

The engine driven shaft 42 is preferably driven from the powershaft of the transversely arranged vehicle prime mover through a belt 87 engaging an adjustable pulley assembly 88 which is fixed for rotation with the shaft 42. Shaft 42 is journalled for rotation by spaced anti-friction bearings 89 and 90 about an axis spaced from and parallel to the axis of rotation of the differential mcehanism 30, bearings 89 and 90 being mounted respectively within a bore 92 through the end wall of drive train housing section 46 and in the bore 94 of a bearing cage 96 which is piloted within bore 92 and secured to the end wall of drive train housing section 46 by bolts 98.

The change speed and reverse drive mechanism 40 includes an output shaft 100 which, in the disclosed embodiment of the invention, is mounted for rotation in coaxial alignment with the engine driven shaft 42 by an anti-friction bearing 102 in the end wall of drive train housing section 44 and by a pilot bearing 104 in an end recess 106 of the engine driven shaft 42. The output shaft 100 can be directly coupled to the engine driven shaft 42 or can be connected thereto through change speed or reverse drive gearing which will be described in detail presently. For the establishment of a direct drive between shafts 42 and 100, cooperating toothed clutch elements are provided upon shafts 100 and 42. For this purpose a gear 108, which is splined to the shaft 100 for axial sliding movement therealong, is provided at its end adjacent shaft 42 with a recess 109 the side wall of which is formed with an internal annular row of clutch teeth 110 and an enlarged end section of shaft 42 is formed with an external annular row of clutch teeth 112. Clutch teeth 110 and 112 form complementary positive clutch elements which, when engaged by axial movement of gear 108 toward shaft 42, are effective to establish a positive drive connection there-between.

The speed reduction or transfer gear train 36, which interconnects the transmission mechanism output shaft 100 with the cage 38 of the differential mechanism 30, comprises a gear 114 fixed to the end of the shaft 100 adjacent the anti-friction bearing 102, a gear cluster 116 journalled for rotation in spaced anti-friction bearing 118 and 120 about an axis parallel to that of shaft 100 and including a gear 122 which is in constant mesh with the gear 14 on the shaft 100 and axially spaced gear 124, which is in constant mesh with a relatively large gear 126 splined to a sleeve 128 rotatably mounted upon the differential cage section 68 of the differential mechanism cage 38, and an epicyclic train, such as planetary gear mechanism 130, which is operatively connected to drive the differential mechanism cage 38.

The sleeve 128, is formed with peripherally spaced longitudinally extending external teeth one end of which coact with complementary internal teeth on gear 126 to form a spline connection to non-rotatably secure gear 126 to sleeve 128 between axially fixed split rings 132 and 134 and the other end of which serve as a sun gear for the planetary gear mechanism 130. An internal ring gear 136 is fixed within the housing section 46 in surrounding relation to the end of the sleeve 128 which serves as a sun gear, and a plurality of equiangularly disposed planetary pinions 138, each of which is in contant mesh with both the ring gear 136 and the sun gear portion of the sleeve 128, are each rotatably mounted upon one of the pins 140 which are fixed upon radially extending arms 142 of the section 68 of the differential mechanism cage 38.

From the foregoing description of the drive mechanism, it is apparent that when clutch teeth 110 are engaged with clutch teeth 112 to establish a direct drive between engine driven shaft 42 and the transmission output shaft 100, sleeve 128 is driven from shaft 100 through the gear train consisting of gears 114, 122, 124 and 126, and the cage 38 of the differential mechanism 30 is caused to rotate about its axis by the epicyclic movement of the planetary pinions 130 carried thereby in constant engagement with the internal ring gear 136 and with the rotating sun gear portion of sleeve 128.

It will be noted from the foregoing explanation that an extremely compact mechanism has been provided, the change speed and reverse drive transmission mechanism 40 being aligned with the differential mechanism 30 transversely of the vehicle and the speed reduction mechanism 36 interconnecting the two being located at one side thereof preferably at the side adjacent the vehicle drive wheel 10 adjacent which the assembly 25 is mounted. The entire mechanism forming this vehicle drive train is thus sufficiently compact and of such construction that it can be located entirely within the axially projected profile of the drive wheel 10, as is fully apparent from Figure 3, while providing the necessary high ratios of speed reduction between the prime mover output and the drive wheels required in farm implements such as crop harvesting vehicles.

The change speed and reverse drive transmission mechanism 40 of the drive train 25 is best illustrated in reference to Figures 2 and 4. Referring first to Figures 3 and 4, as has previously been indicated, a gear 108 is mounted for conjoint rotation with and axial sliding movement upon an externally splined portion 150 of the transmission unit output shaft 100. A second and larger gear 152 is similarly mounted for axial sliding movement upon and conjoint rotation with this splined portion 150 of shaft 100. A gear 154 is fixed upon the end of the engine driven shaft 42 intermediate the external annular row of clutch teeth 112 and anti-friction bearing 89, being preferably formed integral with shaft 42 as shown. A gear cluster 156, consisting of gears 158, 160, 162 and 164, is mounted for rotation by anti-friction bearing 166 and 168 upon a shaft 170 extending parallel to the common axis of rotation of shafts 42 and 100 and fixed in the opposite walls of the housing section 46. An idler gear 172 is journalled for rotation about an axis parallel to that of shaft 170 by an anti-friction bearing 174 upon a shaft 176 which is fixed within aligned bores 178 and 180 formed respectively through the end wall of the housing section 46 and an integral mounting lug 182. As is best illustrated in Figure 2, shaft 176 on which gear 172 is journalled is so positioned relative to shaft 170 and shaft 100 that gear 172 is in constant mesh with gear 164 of gear cluster 156 and can be engaged by gear 152 on shaft 100 when gear 152 is shifted axially of shaft 100 for that purpose.

Referring again to Figure 4, gear cluster 156 is constantly driven through the meshing engagement of gear 158 on gear cluster 156 with the gear 154 on the engine driven shaft 42 at a speed proportional to the speed reduction between gears 158 and 154.

As has been previously pointed out, if gear 108 is shifted axially of the spline 150 toward the shaft 42, clutch teeth 110 can be engaged with clutch teeth 112 to establish a direct drive between shaft 42 and shaft 100. If gear 108 is shifted along spline 150 away from the shaft 42, it can be meshed with the gear 160 to establish a drive connection from shaft 42 to shaft 100 through gears 154, 158, 160 and 108 to the shaft 100. If gear 152 is shifted axially of spline 150 toward the shaft 42, it can be meshed with gear 162 of gear cluster 156 to establish in a similar manner a second speed reduction ratio between shafts 42 and 100 through gears 154, 158, 162 and 152. If gear 152 is shifted axially of spline 150 away from the shaft 42, it will be meshed with the gear 172 on the countershaft 176 which in turn is in constant mesh with the gear 164 of the gear cluster 156 and will thus impart a reverse drive to output shaft 100 from shaft 42 through gears 154, 158, 164, 172 and 152.

By reference to Figures 3 and 4, it will be noted that the change speed and reverse drive transmission mechanism 40 is segregated within compartment 50 from the speed reduction or transfer gear mechanism 36 and the differential mechanism 30 by a partition 184 which, with oil seal 186 surrounding the shaft 100, plate 188 which seals the opening at bearing 120, oil seal 190 which seals the opening through bearing cage 96, and a tower 192 which closes the top opening 194 of housing section 46, encloses the transmission mechanism 40 within compartment 50.

Figure 5:
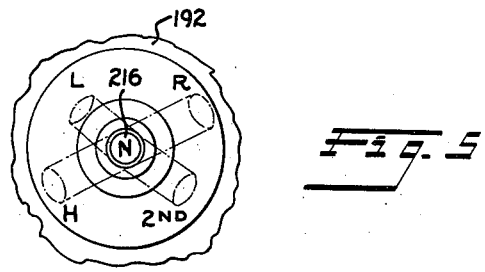
Figure 5 is a diagrammatic illustration of the several shift positions of the operating lever for the change speed and reverse drive transmission mechanism of the vehicle drive train assembly.

Axial movement of gears 108 and 152 for controlling the speed reduction between engine driven shaft 42 and the output shaft 100 in the manner heretofore described is controlled by a pair of shifting forks 200 and 202 which respectively engage peripheral grooves 204 and 206 on the gears 152 and 108. As is best illustrated in Figures 2 and 3, shifting fork 200 is fixed to a shift rod 208 which is mounted for axial movement in aligned bores 210 and 212 formed through the tower 192 which is fixed to the top of the housing section 46 in such a position that the axis of the shift rod 208 is parallel to the axis of the output shaft 100. Shifting fork 202 is similarly mounted upon an independent shift rod 214 (Figure 2) to the rear of shift rod 208 as viewed in Figure 3. A shift lever 216 is universally mounted by a ball and socket connection upon the tower 192 for alternative operative engagement of its lower end with shifting fork 200 or shifting fork 202 in the conventional manner. The various adjusted positions of the shifting lever 216 as viewed from above lever 216, are shown diagrammatically in Figure 5.

In accordance with the general object of this invention to provide a compact drive train, a brake mechanism, consisting of a brake drum 220 fixed to the end of the shaft portion 222 of the gear cluster 116 as by a key 224 and machine screw 226, and a pair of coacting brake shoes 228 and 230 pivotally mounted upon the housing section 44 at 232 (Figure 2), is provided at the end of the assembly within the radially projected profile of the drive wheel 10 thus providing highly effective braking and compactness of the assembly. A lubricant seal 234 surrounds shaft portion 222 to complete the sealing of the unitary housing structure against the egress of lubricant and ingress of dirt and moisture. The entire drive train assembly 25 is rotatable as a unit about the common axis of shafts 26 and 28 to position the pulley 88 on engine drive shaft 42 relative to the power shaft of the prime mover to adjust the tension of the belt 87. The drive train assembly 25 after adjustment, is fixed in position relative to the vehicle frame by structure similar to that disclosed for the purpose on copending application Serial No. 175,146 for Drive Mechanism filed on July 21, 1950, by Keese et al.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In combination, an axle housing supported at opposite ends by ground engaging wheels and having an enlarged intermediate portion, a differential cage mounted for rotation within said axle housing portion, axle drive shafts projecting oppositely from said cage through the axle housing and connected at their outer ends to said wheels, a sun gear journalled solely on said cage, a ring gear fixed to the axle housing, a plurality of circumferentially spaced planet gears rotatably mounted on said cage and constantly meshed with said ring and sun gears, a drive gear mechanism housing extending rigidly upwardly from said axle housing portion and substantially supported thereby, an engine driven shaft rotatably mounted in said drive gear mechanism housing parallel to said axle shafts and in spaced relation to said differential cage, and drive reduction gearing within said drive gear mechanism housing disposed between said engine driven shaft and said sun gear.

2. In combination, an axle housing supported at opposite ends by ground engaging wheels and having an enlarged intermediate portion, a differential cage mounted for rotation within said axle housing portion, axle drive shafts projecting oppositely from said cage through the axle housing and connected at their outer ends to said wheels, a gun gear journalled solely on said cage, a ring gear fixed to the axle housing, a plurality of circumferentially spaced planet gears rotatably mounted on said cage and constantly meshed with said ring and sun gears, a drive gear mechanism housing extending rigidly upwardly from said axle housing portion and substantially supported thereby, an engine driven shaft rotatably mounted in said drive gear mechanism housing parallel to said axle shafts and in spaced relation to said differential cage, and drive reduction gearing within said drive gear mechanism housing disposed between said engine driven shaft and said sun gear comprising at least two successive spur gear pairs with the final gear thereof non-rotatably disposed on said sun gear and thereby rotatably mounted on said cage.

3. In combination, an axle housing supported at opposite ends by ground engaging wheels and having an enlarged intermediate portion, a differential cage mounted for rotation within said axle housing portion, axle drive shafts projecting oppositely from said cage through the axle housing and connected at their outer ends to said wheels, a sun gear journalled solely on said cage, a ring gear fixed to the axle housing, a plurality of circumferentially spaced planet gears rotatably mounted on said cage and constantly meshed with said ring and sun gears, a power driven shaft rotatably mounted parallel to said axle shafts above and in spaced relation to said differential cage, and drive reduction gearing disposed between said engine driven shaft and said sun gear comprising an intermediate shaft rotatably mounted parallel to said axle shafts, a first spur gear on the power driven shaft meshed with a second spur gear on the intermediate shaft, a third spur gear on the intermediate shaft meshed with a fourth spur gear non-rotatably mounted on said sun gear and thereby rotatably mounted on said cage.

4. In combination: an axle housing supported at opposite ends by ground engaging wheels and having an enlarged intermediate portion; a differential cage mounted for rotation within said axle housing portion; axle drive shafts projecting oppositely from said cage through the axle housing and connected at their outer ends to said wheels; a collar journalled on said cage having an axially splined periphery, one section of which serves as a sun gear; a ring gear fixed to the housing; a plurality of circumferentially spaced planet gears rotatably mounted on said cage and constantly meshed with said ring gear and sun gear; a power driven shaft rotatably mounted parallel to said axle shafts above and in spaced relation to said differential cage; and drive reduction gearing disposed between said power driven shaft and said sun gear comprising an intermediate shaft rotatably mounted parallel to said axle shafts, a first spur gear on the power driven shaft, a second spur gear on the intermediate shaft meshed with said first spur gear, a third spur gear on said intermediate shaft and a fourth spur gear splined to a section of said collar adjacent the sun gear section and meshed with said third spur gear.

5. In combination, an axle housing supported at opposite ends by ground engaging wheels and having an enlarged intermediate portion, a differential cage mounted for rotation within said axle housing portion, axle drive shafts projecting oppositely from said cage through the axle housing and connected at their outer ends to said wheels, a sun gear journalled solely on said cage, a ring gear fixed to the axle housing, a plurality of circumferentially spaced planet gears rotatably mounted on said cage and constantly meshed with said ring and sun gears, a drive gear mechanism housing extending rigidly upwardly from said axle housing portion and substantially supported thereby, said housings defining a variable speed transmission compartment above said axle housing intermediate portion and a side compartment for drive reduction gearing, a rotatable transmission output shaft parallel to said axle shafts and projecting into said side compartment and drive reduction gearing within said side compartment disposed between said transmission output shaft and said sun gear.

References Cited in the file of this patent

UNITED STATES PATENTS

| Re.15,711 | Baker | Oct. 30, 1923 |
| 671,575 | Woosley | Apr. 9, 1901 |
| 896,624 | Christie | Aug. 18, 1908 |
| 1,309,978 | Baker | July 15, 1919 |
| 1,329,319 | Baker | Jan. 27, 1920 |
| 1,382,280 | Foote | June 21, 1921 |
| 1,511,156 | Bolgiano | Oct. 7, 1924 |
| 1,903,383 | Winquist | Apr. 4, 1933 |
| 2,015,218 | Dufour | Apr. 24, 1935 |
| 2,293,200 | Foote | Aug. 18, 1942 |
| 2,448,345 | Aronson | Aug. 31, 1948 |
| 2,510,325 | Anderson | June 6, 1950 |